United States Patent
Nojima et al.

(10) Patent No.: US 6,515,379 B1
(45) Date of Patent: Feb. 4, 2003

(54) POWER SUPPLY APPARATUS, METHOD, AND ELECTRONIC APPARATUS

(75) Inventors: Koichi Nojima, Tokyo (JP); Kiyokazu Nagahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 45 days.

(21) Appl. No.: 09/587,590

(22) Filed: Jun. 2, 2000

(30) Foreign Application Priority Data

Jun. 3, 1999 (JP) .......................................... 11-156868

(51) Int. Cl.[7] ................................................ H02H 3/26
(52) U.S. Cl. ......................... 307/64; 307/130; 363/143; 323/271
(58) Field of Search .......................... 307/64, 43, 130; 363/142, 143, 88, 100, 61, 84; 323/271, 272, 299, 300

(56) References Cited

U.S. PATENT DOCUMENTS

| | | | |
|---|---|---|---|
| 4,675,801 A | * | 6/1987 | Terada ......................... 323/272 |
| 4,780,805 A | * | 10/1988 | Chewuk et al. ................ 307/64 |
| 4,864,488 A | * | 9/1989 | Bulmahn et al. ........... 363/143 |
| 6,154,380 A | * | 11/2000 | Assow et al. .................. 363/61 |

FOREIGN PATENT DOCUMENTS

JP   06-181553   *   6/1994

* cited by examiner

Primary Examiner—Brian Sircus
Assistant Examiner—Roberto J. Rios
(74) Attorney, Agent, or Firm—Jay H. Maioli

(57) ABSTRACT

When a relay (21) is controlled, an AC voltage (1) may be rectified in a full-wave rectification fashion. In a voltage-doubler rectification fashion, and a rectified output supplied to a main converter (6) or the AC voltage (1) may be rectified in a half-wave rectification fashion, and a rectified output supplied to a standby converter (10). A just detection circuit (23) detects a rectified voltage of the standby side, and a detection circuit (24) may detect a rectified voltage supplied to the main converter (6). The first and second voltage detection circuits (23) and (24) control operations of relay drive circuits (21D and 22D) based on both detection signals so that any one of two relay contacts (21a and 22a) may be turned on. Since a voltage of the rectified output supplied to the main converter (6) may be detected and its detection signal also may be used for control, a detection timing can be made fast so that, even when the voltage of the commercially-available voltage is fluctuated suddenly, the rectification systems can be switched immediately.

12 Claims, 9 Drawing Sheets

(AC)

HALF-WAVE CAN BE DETECTED

HALF-WAVE CANNOT BE DETECTED (HALF-WAVE RECTIFICATION)

POWER SUPPLY APPARATUS, METHOD, AND ELECTRONIC APPARATUS

BACKGROUND OF THE INVENTION

1. Field of the Invention

The present invention generally relates to a power supply apparatus for use with a television receiver, a monitor or the like, for example. More particularly, this invention relates to a power supply apparatus comprising a main power supply section for rectifying a voltage in either a full-wave rectification fashion or a voltage-doubler rectification fashion in response to a voltage supplied from a commercial alternating-current power supply and a standby power supply section for rectifying a voltage of a commercial alternating-current (hereinafter simply referred to as an AC) in which a full-wave rectification and a voltage-doubler rectification may be switched by detecting rectified outputted voltages from the standby power supply section and the main power supply section.

2. Description of the Related Art

FIG. 1 of the accompanying drawings shows an arrangement of a related-art power supply apparatus for use with a television receiver, a monitor or the like. A power supply apparatus 200, generally depicted by reference numeral 200 in FIG. 1 can be used in the area in which a voltage of a AC power supply is 100V and in the area in which a voltage of a AC power supply is 220V.

As shown in FIG. 1, in the power supply apparatus 200, one end of a AC power supply 1 may be connected to one input terminal of a bridge-type rectifier 2. The other end of this AC power supply 1 may be connected to the other input terminal of the bridge-type rectifier 2 through a contact 3a of a relay 3. The relay 3 may be adapted to supply or to interrupt the AC power supply 1. A relay drive circuit 3D which may drive the relay 3 may be driven under control of a power supply control signal (hereinafter simply referred to as "CPW") supplied from a control section (not shown). When the signal CPW is held at high level, the relay 3 may be driven to close the contact 3a thereby to supply the voltage of the AC power supply 1.

When a contact 7a of a relay 7 is opened, the voltage of the AC power supply 1 may be rectified by the bridge-type rectifier 2 in a full-wave rectification fashion. Then, a DC voltage smoothed by capacitors 4 and 5 connected in series may be inputted to a main DC/DC converter 6. Also, when the contact 7a of the relay 7 is closed, a DC voltage (hereinafter simply referred to as a DC voltage) which was smoothed by the capacitor 4 after it had been rectified by one diode of the bridge-type rectifier 2 and a DC voltage smoothed by the capacitor 5 after it had been rectified by another one diode of the bridge-type rectifier 2 may be added and a voltage-doubler rectification can be performed. The main DC/DC converter 6 may convert the supplied DC voltage into DC voltages of a variety of voltages necessary for a television, a monitor or the like, for example.

The voltage from the AC power supply 1 may be rectified/smoothed by a diode 8 and a capacitor 9 and then inputted to a standby DC/DC converter 10. This standby DC/DC converter 10 may supply a DC voltage necessary for maintaining functions of the control section, the relay drive, the voltage detection circuit or the like when the main DC/DC converter 6 is disabled.

A voltage detection circuit 11 may compare a voltage Vs rectified/smoothed by the diode 8 and the capacitor 9 with a predetermined threshold voltage. The voltage detection circuit 11 may output a detection output (hereinafter simply referred to as "VDE") which goes to low level when the voltage Vs is higher than the predetermined threshold voltage and which goes to high level when the voltage Vs is lower than the predetermined threshold voltage. The voltage detection circuit 11 may have a hysteresis characteristic in which a high threshold voltage may be set to DC225V and a low threshold voltage may be set to DC190V, for example. The output VDE may be supplied to a relay drive circuit 7D as a control signal. When the output VDE is held at high level, the relay drive circuit 7D may drive the relay 7 to close: a relay contact 7a, whereby a voltage-doubler rectification can be performed.

FIG. 2 shows an example of an arrangement of this voltage detection circuit 11 more concretely. As shown in FIG. 2, a voltage Vcc applied to a power supply terminal 51 may be supplied through a resistor R7 to a shunt regulator IC2 which may be used to generate a reference voltage. A series circuit of resistors R8 and R9 may be connected to the shunt regulator IC2 in parallel. A voltage developed at a junction between the resistors R8 and R9 may be supplied to the shunt regulator IC2. The shunt regulator IC2 may increase or decrease a current flowing thereto such that the above-mentioned voltage may become constant. Thus, a predetermined reference voltage Vrf may be developed at the junction between the resistors R7 and R8.

As shown in FIG. 2, a voltage Vs may be supplied to a detection voltage input terminal 53 as a detection voltage. A voltage Va that was voltage-divided by resistors R5 and R6 may be supplied to a negative input terminal of a comparator IC1. The reference voltaege Vrf may be supplied through a resistor R4 to a positive input terminal of the comparator IC1. The resistors R3 and R4 may be give a hysteresis characteristic to the comparator IC1, and a diode D2 may be used in order to block a reverse current.

An output terminal of the comparator IC1 may be connected to the base of a transistor Q1, and a bias may be applied to the base of the transistor Q1 from the resistors R1 and R2. The collector of the transistor Q1 may be connected through a coil 7b of the relay 7 to the power supply terminal 51. A diode D1 which is connected in parallel to the coil 7b may be used to suppress the collector voltage of the transistor Q1 from increasing due to a back electromotive force generated in the relay 7 when the transistor Q1 is turned off.

When the voltage of the AC power supply 1 is low (e.g. 100V), accordingly, the detection voltage Vs is low, the voltage Va supplied to the negative input terminal of the comparator IC1 may become lower than the voltage supplied to its positive input terminal so that the output VDE of the comparator IC1 goes to high level. At that very moment, since the transistor Q1 is turned on to drive the relay 7, the contact 7a of the relay 7 may be closed, whereby the voltage-doubler rectification operation can be performed.

When on the other hand the voltage of the AC power supply 1 is high (e.g. 200V), accordingly, the detection voltage Vs is high, the voltage Va supplied to the negative input terminal of the comparator IC1 becomes higher than the voltage supplied to its positive input terminal so that the output VDE of the comparator IC1 goes to low level. At that very moment, since the transistor Q1 is turned off and the relay 7 may not be driven, the full-wave rectification operation may be performed.

When the AC voltage is fluctuated suddenly, in particular, a voltage rises or when a power failure of a short period of time occurs or when a relay drive circuit is operated abnormally, it is unavoidable that the main DC/DC converter is considerably affected by a resultant stress.

SUMMARY OF THE INVENTION

It is an object of the present invention to provide a reliable power supply apparatus in which the aforementioned problem can be obviated.

According to the present invention, there is provided a power supply apparatus which is comprised of a main power supply section including a rectifying circuit supplied with a AC voltage through a first or second contact, the rectifying circuit for rectifying the AC voltage in a full-wave rectification fashion or in a voltage-doubler rectification fashion, a standby power supply section including a rectifying circuit for rectifying the AC voltage, a first voltage detection section for detecting whether the rectified output from the standby power supply section is higher than or lower than a predetermined threshold voltage, a second voltage detection section for detecting whether the rectified output from the main power supply section is higher than or lower than a predetermined threshold voltage, and a switch control section for closing any one of the first and second contacts based on a detection signal from the first voltage detection section and a detection signal from the second voltage detection section.

The main power supply section rectifies the AC power supply voltage supplied thereto through the first contact in a full-wave rectification fashion when the voltage of the AC power supply is high, and rectifies the AC power supply voltage supplied thereto through the second contact in a voltage-doubler rectification fashion when the voltage of the AC power supply is low. Control for opening and closing the first and second contacts may be executed by comparing the rectified voltage of the standby power supply and the rectified voltage of the main power supply with a predetermined voltage. Although the voltage change which was started on the rectified half-wave side can be detected by detecting the rectified voltage of the standby power supply, the voltage change which was started on the half-wave side which is not rectified cannot be detected by detecting the rectified voltage of the standby power supply. There is then the possibility that the detection will be delayed until the next half-wave is rectified. By detecting the rectified voltage of the standby power supply together with the rectified voltage of the main power supply, it is possible to provide a highly-reliable power supply apparatus in which the above-mentioned possibility can be obviated.

For example, the first and second voltage detection sections may comprise a comparator for comparing a first voltage corresponding to a threshold voltage and a second voltage corresponding to the rectified output and a charge and discharge circuit inserted into this comparator at its input side of the second voltage. A discharge time constant of the charge and discharge circuit may be made larger than a charge time constant thereof. Thus, under the state that the output level of the comparator selects the full-wave rectification, when a power failure of a short period of time occurs in the AC power supply, an output from the charge and discharge circuit is lowered slowly as compared with the case in which the second voltage is lowered. Hence, the output level of the comparator can be maintained in the state in which such output level selects the full-wave rectification. Thus, when the power failure is ended, the voltage-doubler rectification is not executed and the main DC/DC converter 6 can be protected.

Further, according to the present invention, there is provided a power supply apparatus which is comprised of a main power supply section including a rectifying circuit supplied with a AC voltage through a contact of a first relay or a contact of a second relay, the rectifying circuit for rectifying the AC voltage in a full-wave rectification fashion or a voltage-doubler rectification fashion, a standby power supply section for obtaining a standby power from the AC voltage, a voltage detection section for detecting whether a voltage of the AC voltage is higher than or lower than a predetermined threshold voltage, a first relay drive section for driving the first relay, a second relay drive section for driving the second relay, a switch control section for controlling operations of the first relay drive section and the second relay drive section based on the detected signal from the voltage detection section such that any one of the contact of the first relay and the contact of the second relay is turned on, a switch section for supplying a power source voltage obtained at the standby power supply section to the first relay drive section and the second relay drive section and a power supply on-off control section for controlling on-off of the switch section based on a power supply on-off control signal.

According to this invention, the main power supply section rectifies the AC power supply voltage supplied thereto through the contact of the first relay in a full-wave rectification fashion, and rectifies the AC power supply voltage supplied thereto through the contact of the second relay in a voltage-doubler rectification fashion. In this case, when the voltage of the AC power supply voltage is low, the contact of the second relay is closed such that the voltage-doubler rectification can be executed. When on the other hand the voltage of the AC power supply voltage is high, the contact of the first relay is closed so that the full-wave rectification can be executed.

Control operations for opening and closing the contacts of the first and second relays may be executed by controlling the first and second relay drive sections, respectively, based on the voltage detection signal of the standby power supply rectified output and the voltage detection signal of the main power supply rectified output. The power supply voltage may be supplied to the first and second relay drive sections from the standby power supply through the switch section. When the switch section is opened, the power supply voltage is not supplied to the first and second relay drive sections. Thus, both of the contacts of the first and second relays are turned off, thereby resulting AC voltage is not supplied to the main power supply. When on the other hand the switch section is closed, the power supply voltage is supplied to the first and second relay drive sections so that the contact of the first or second relay is closed based on the voltage detection signal, thereby resulting AC voltage is supplied to the main power supply.

As described above, since the contacts of the first and second relays may be served as also the power supply switch so that the voltage-doubler rectification operation, for example, is effected, only the second relay can be energized. Thus, a power consumption can be decreased.

For example, the power supply apparatus according to the present invention may further include an abnormal voltage detection section for detecting whether the rectified output from the main power supply section is higher than or lower than a predetermined threshold voltage. The power supply on-off control section may control on-off of the switch section based on a detection signal from the abnormal voltage detection section in addition to the power supply on-off control signal. Thus, when the contact of the second relay is closed due to an abnormal operation of the second relay drive section or the like so that an abnormally-high voltage is generated as a rectified output, the supply of power to the second relay is interrupted by de-energizing the switch section based on the detection signal from the abnormal voltage detection section. Thus, a rectified output voltage can be lowered, thereby resulting the main DC/DC converter 6 can be protected.

DETAILED DESCRIPTION OF THE INVENTION

A power supply apparatus according to an embodiment of the present invention will hereinafter be described with reference to the drawings.

Figure 1:
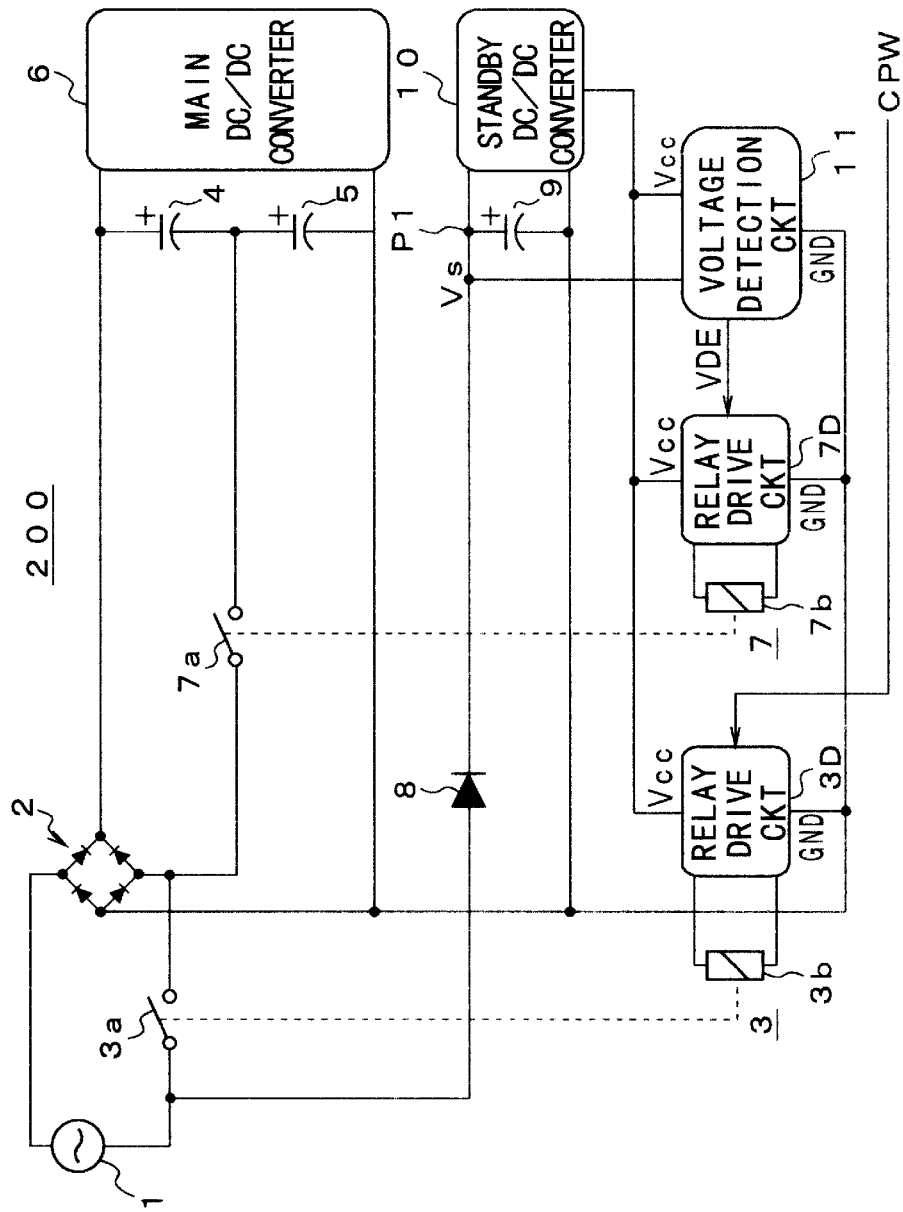
FIG. 1 is a circuit diagram showing a power supply apparatus according to the related art.
Figure 3:
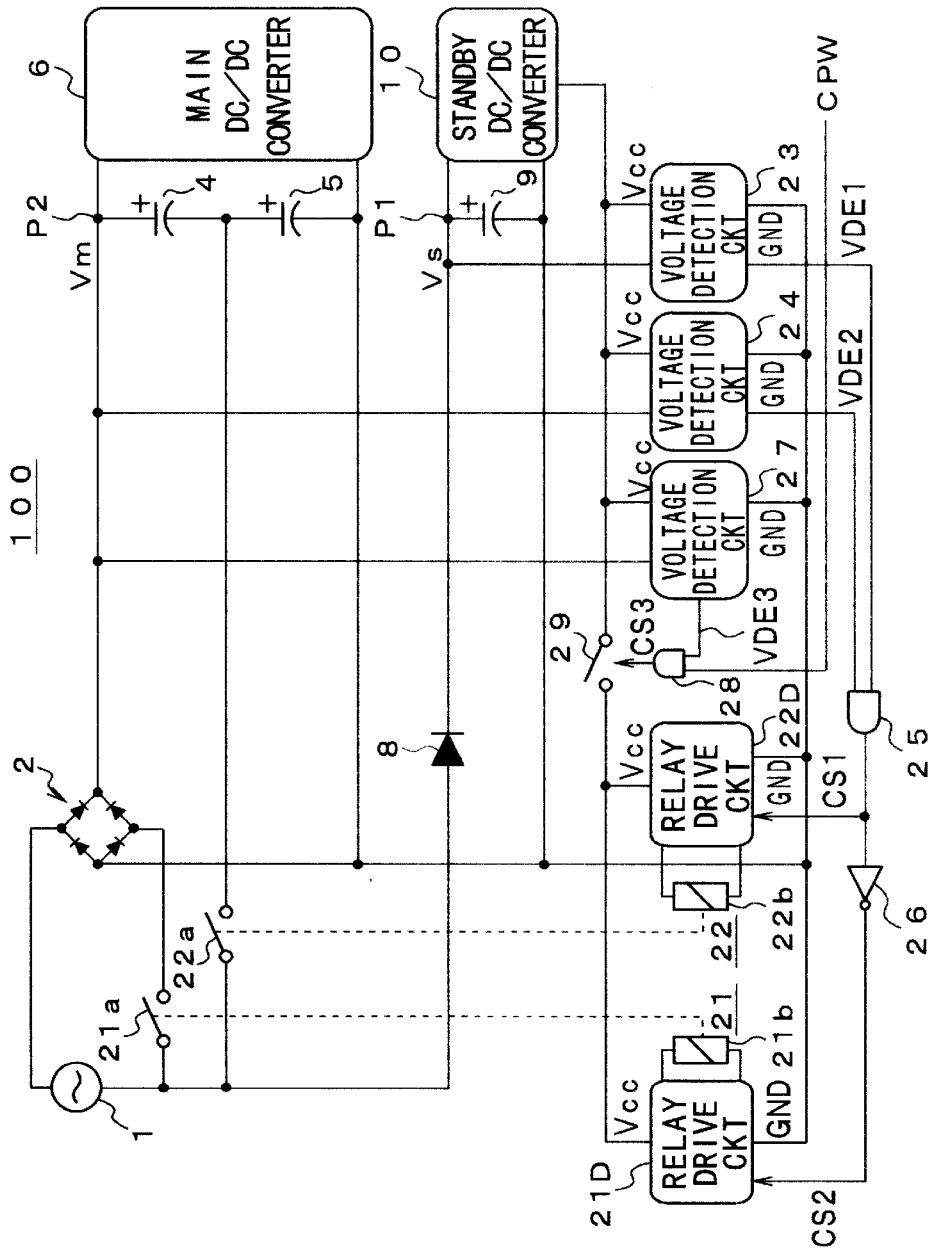
FIG. 3 is a circuit diagram showing a power supply apparatus according to an embodiment of the present invention.

FIG. 3 shows a power supply apparatus 100 according to an embodiment of the present invention. In FIG. 3, elements and parts identical to those of FIG. 1 are marked with the identical reference numerals. This power supply apparatus 100 can be used in the area in which a voltage of a AC power supply may be 100V, 115V or 220V.

As shown in FIG. 3, the AC power supply 1 may be connected through a contact 21a of a relay 21 to the bridge-type rectifier 2. The contact 21a of the relay 21 may be served as also a power supply switch so that, when the contact 21a of the relay 21 is closed, the full-wave rectification may be effected on voltage of the AC power supply 1. This relay 21 may be driven by a relay drive circuit 21D.

A voltage smoothed by the smoothing capacitors 4 and 5 after it had been rectified by the bridge-type rectifier 2 may be supplied to the main DC/DC converter 6. The main DC/DC converter 6 may convert an inputted DC voltage into various kinds of DC voltages used in a television receiver, a monitor or the like, for example.

The other end of the AC power supply 1 may be connected to the capacitors 4 and 5 through a contact 22a of a relay 22. The contact 22a of the relay 22 may be served as also a power supply switch so that, when the contact 22a of the relay 22 is closed, the voltage-doubler rectification may be effected on the voltage of the AC power supply 1. This relay 22 may be driven by a relay drive circuit 22D.

Since the relay contacts 21a and 22a may be operated as power supply switches as well as the full-wave rectification operation switch and the voltage-doubler rectification operation switch, respectively, a power consumption for driving the relays can be decreased as compared with the case in which the relays are provided independently.

The voltage of the AC power supply 1 may be rectified by the diode 8, smoothed by the capacitor 9 and then supplied to the input of the standby DC/DC converter 10. The standby DC/DC converter 10 may supply a DC voltage necessary for maintaining the functions of the control section, the relay drive circuit, the voltage detection circuit or the like when the main DC/DC converter 6 is disabled.

A junction P1 between the diode 8 and the capacitor 9 may be connected to the input side of a voltage detection circuit 23. This voltage detection circuit 23 may compare a voltage Vs developed at the junction P1 with a predetermined threshold voltage, and may output an output VDE1 of low level when the voltage Vs is higher than the predetermined threshold voltage and an output VDE 1 of high level when the voltage Vs is lower than the predetermined threshold voltage. A comparator in the voltage detection circuit 23 may have a hysteresis characteristic in which a high threshold voltage may be set to 225V and a low threshold voltage may be set to 190V, for example.

A voltage Vm developed at a junction P2 between the bridge-type rectifier 2 and the capacitor 4 may be supplied to the input side of a voltage detection circuit 24. This voltage detection circuit 24 may detect whether the voltage Vm is higher than or lower than a predetermined threshold voltage. The voltage detection circuit 24 may generate an output VDE2 of low level when the voltage Vm is higher than the predetermined threshold voltage and the output VDE2 of high level when the voltage Vm is lower than the predetermined threshold voltage. The comparator in the voltage detection circuit 24 has a hysteresis characteristic similarly.

The outputs VDE1 and VDE2 from the voltage detection circuits 23 and 24 may be supplied to an AND circuit 25. The output from the AND circuit 25 may be supplied to the relay drive circuit 22D as a control signal CS1. When both of the voltages Vs and Vm are lower than the predetermined threshold voltages, both of the outputs VDE1 and VDE2 go to high level and the control signal CS1 also goes to high level, whereby the relay 22 may be driven to close the contact 22a, thereby resulting in the voltage-doubler rectification being performed. Also, when any one of the voltages Vs and Vm is higher than the predetermined threshold voltage, one of the outputs VDE1 and VDE2 goes to low level, the control signal CS1 goes to low level and the control signal CS2 goes to high level, whereby the relay 21 may be driven to close the contact 21a, thereby resulting in the full-wave rectification being performed.

The voltage Vm developed at the junction P2 between the bridge-type rectifier 2 and the capacitor 4 may be supplied to a voltage detection circuit 27. The voltage detection circuit 27 may detect an abnormal voltage by comparing the voltage Vm with a predetermined threshold voltage. When the voltage Vm is abnormally higher than the predetermined threshold voltage, the voltage detection circuit 27 may output an output VDE3 of low level. The comparator in the voltage detection circuit 27 also has a hysteresis characteristic similarly, in which a high threshold voltage may be set to DC470V and a low threshold voltage may be set to DC300V, for example.

While the output VDE3 outputted from the voltage detection circuit 27 may be supplied to one input of an AND circuit 28, the signal CPW (power supply on-off signal) which goes to high level when the main power supply is turned on and which goes to low level with the power supply being turned off may be supplied to the other input terminal of the AND circuit 28 from a control section (not shown). When any one of the input is held at low level, a switch 29 may be turned off. Since the power supply voltage Vcc may be supplied through this switch 29 to the relay drive circuits 21D and 22D, when the power supply off signal or the abnormal voltage is detected, the supply of the power supply voltage Vcc to the relays 21 and 22 may be interrupted. Therefore, the switches 21a and 22a may open their contacts to de-energize the main DC/DC converter 6.

When the contact 22a of the relay 22 is closed due to the abnormal operation of the relay drive circuit 22D or the like so that the voltage-doubler rectification may be effected even though the voltage of the AC power supply 1 is held at high level and the control signal CS1 supplied to the relay drive circuit 22D is held at low level, the voltage Vm obtained at the junction P2 may increase much more. As a consequence, the output VDE3 outputted from the voltage detection circuit 27 goes to low level so that the switch 29 may be opened to interrupt the supply of the power supply voltage Vcc to the relay drive circuit 22D. Accordingly, since the state in which the voltage Vm is abnormally high can be canceled, and the main DC/DC converter 6 can be protected.

Figure 4A:
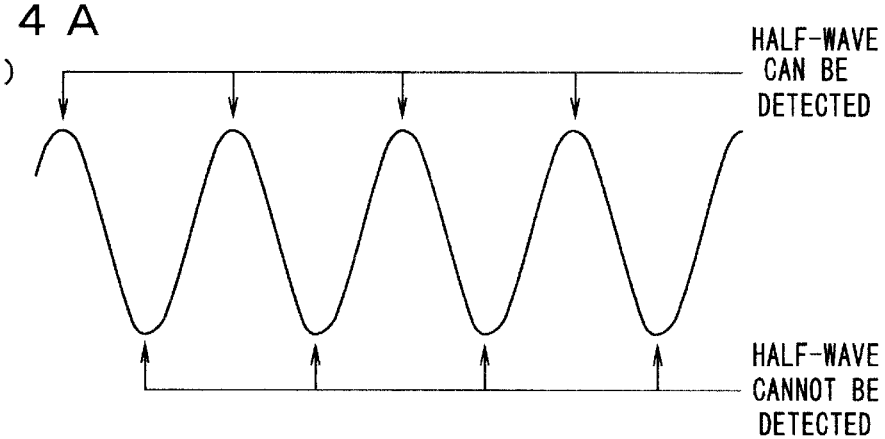
FIGS. 4A and 4B are diagrams to which reference will be made in explaining a voltage detection operation for each half-wave of a commercially-available power supply.
Figure 4B:

As described above, the voltage Vm as well as the voltage Vs may be supplied as the detection voltages and the full-wave rectification and the voltage-doubler rectification can be switched. Since this voltage Vm is obtained from the full-wave of the AC power supply 1 shown in FIG. 4A, even when the voltage of the AC power supply 1 is fluctuated suddenly, the full-wave rectification and the voltage-doubler rectification may be switched immediately in response to such fluctuation. For example, even when the voltage of the AC power supply 1 increases suddenly under the state that the voltage-doubler rectification is performed, the voltage-doubler rectification may be immediately switched to the full-wave rectification, thereby resulting in the main DC/DC converter 6 can be protected.

Figure 5:
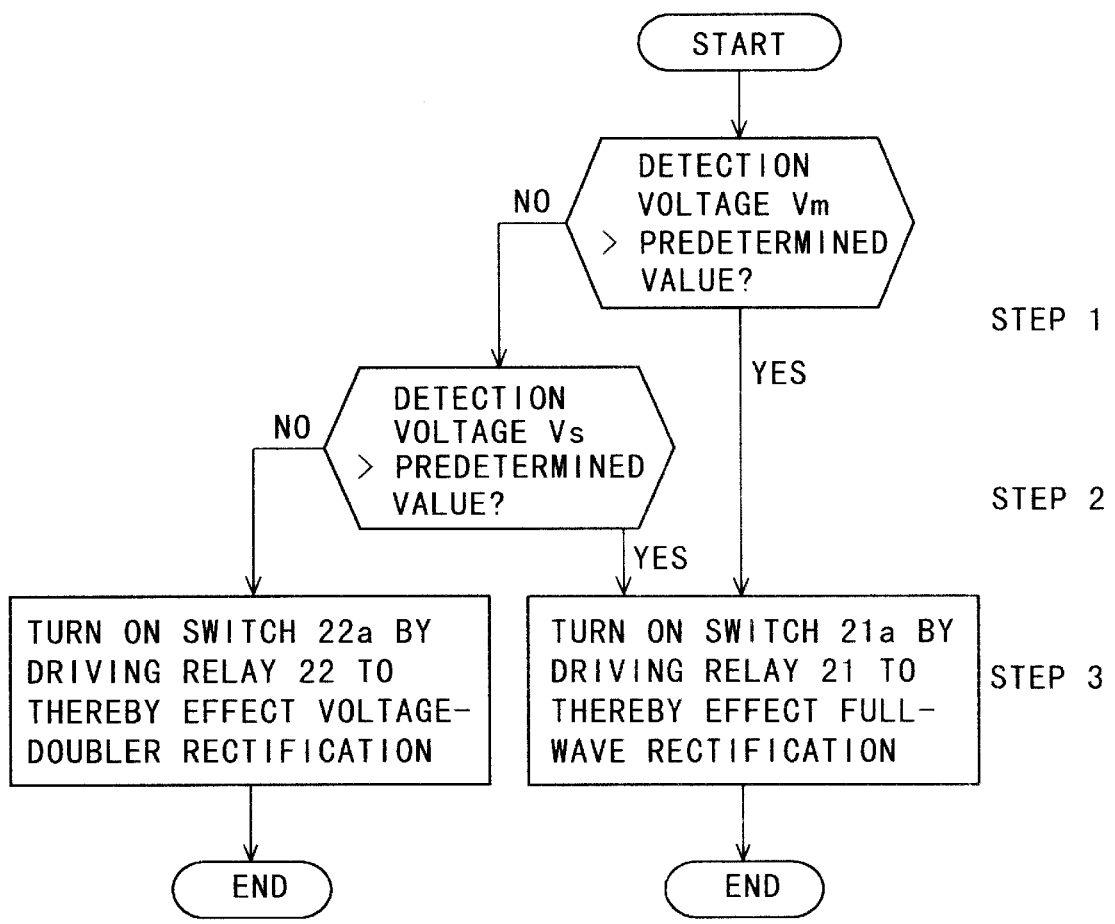
FIG. 5 is a flowchart to which reference will be made in explaining a concrete flow of a power supply control method.
Figure 6:
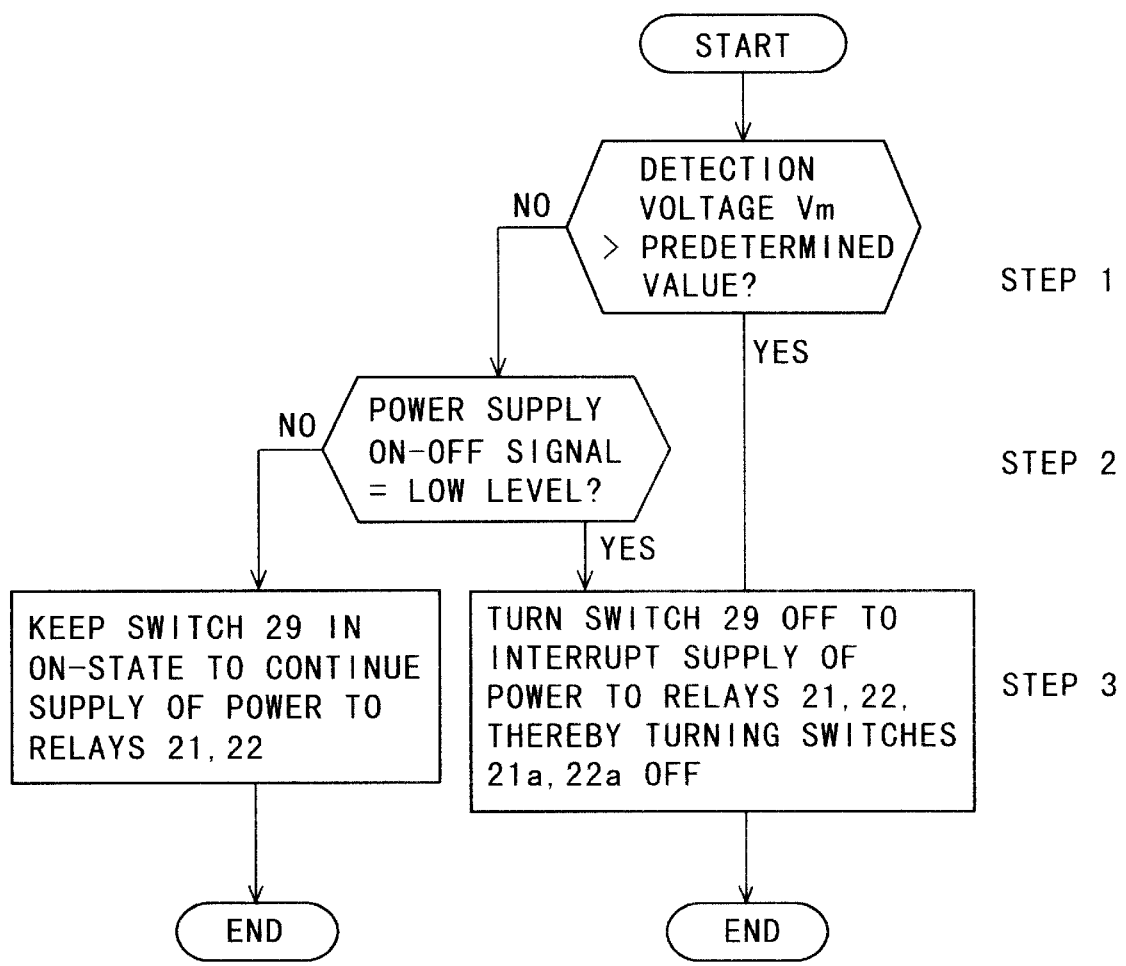
FIG. 6 is a flowchart to which reference will be made in explaining a concrete flow of a power supply control method.

While the voltage detection circuits 23, 24, 27, and the AND circuits 25, 28 can be arranged in the form of the hardware as described above, the present invention is not limited thereto, and they can be arranged in the form of software as shown in flowcharts of FIGS. 5 and 6.

Referring to FIG. 5 and following the start of operation, at a step 1, there may be compared a value corresponding to the detection voltage Vm and a predetermined threshold voltage. At a step 2, there may be compared a value corresponding to the detection voltage Vs and a predetermined threshold voltage. At a step 3, if it is determined based on these compared results that any one of the values corresponding to the detection voltage Vm and the detection voltage Vs is higher than the predetermined threshold voltage, then the switch 21a may be turned on by driving the relay 21 and the full-wave rectification may be performed. If both of the values corresponding to the detection voltage Vm and the detection voltage Vs are lower than the threshold voltages, then the switch 22a may be turned on by driving the relay 22 and the voltage-doubler rectification may be performed.

Referring to FIG. 6 and following the start of operation, at a step 1, there may be compared a value corresponding to the detection voltage Vm and a predetermined threshold voltage. At a step 2, it may be determined whether or not the power supply on-off signal CPW is held at low level. If it is determined at a step 3 based on these compared results that the value corresponding to the detection voltage Vm is higher than the predetermined threshold voltage or that the power supply on-off signal CPW is held at low level, then the switch 29 may be turned off to interrupt the supply of power to the relays 21 and 22, thereby resulting in the switches 21a and 22a being turned off. If it is determined that the value corresponding to the detection voltage Vm is lower than the predetermined threshold voltage or that the power supply on-off signal CPW is held at high level, then the switch 29 may be held in the on-state to thereby continue the supply of power to the relays 21 and 22.

Figure 2:
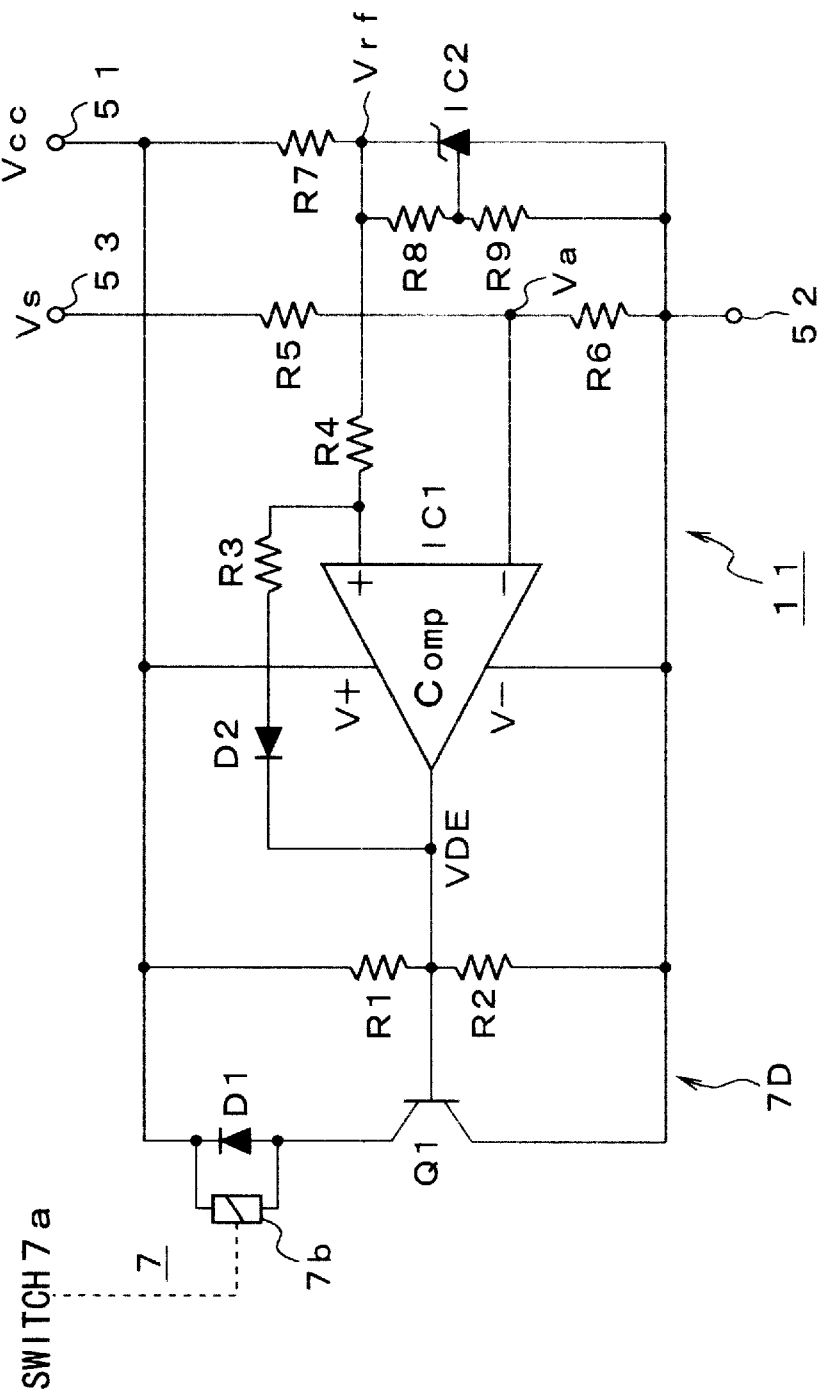
FIG. 2 is a circuit diagram showing examples of a voltage detection circuit and a relay drive circuit according to the related art concretely.
Figure 7:
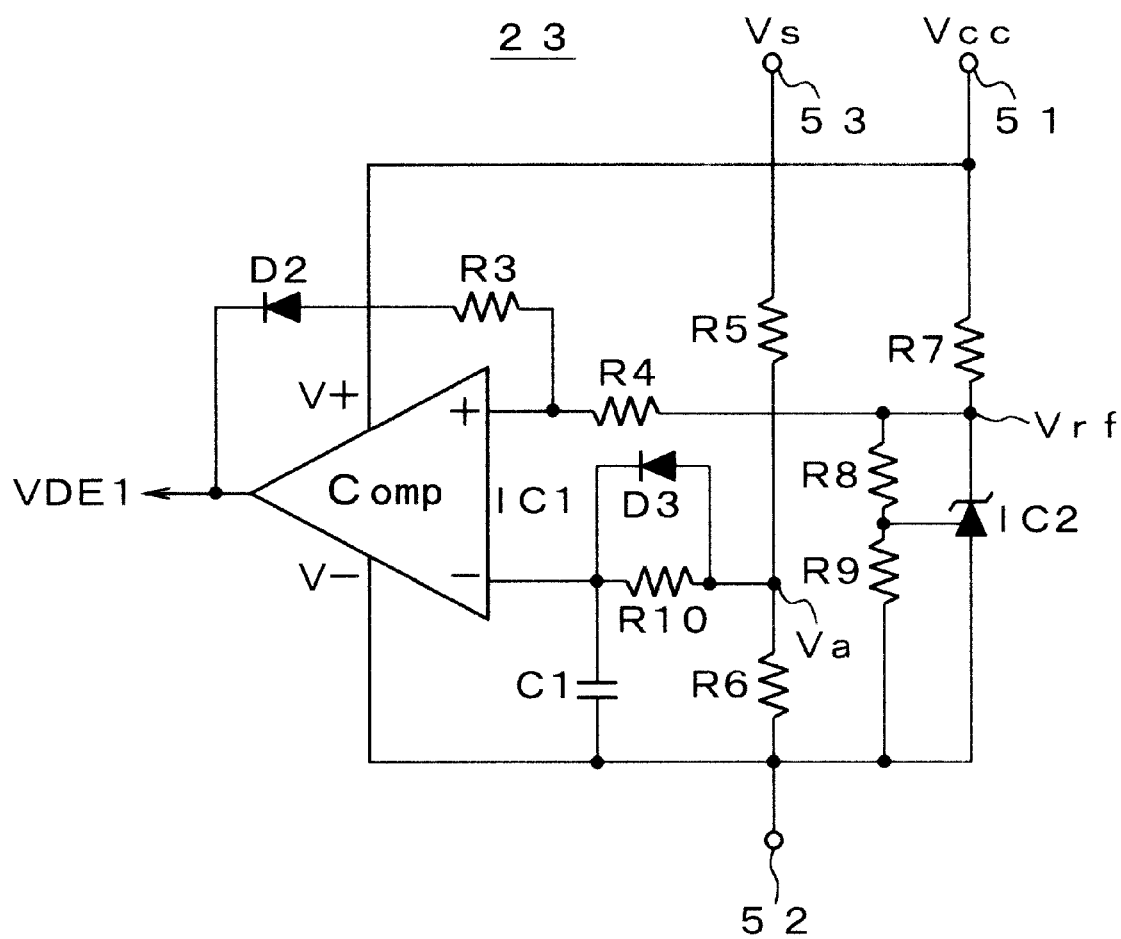
FIG. 7 is a circuit diagram showing an embodiment of a voltage detection circuit.

FIG. 7 shows an embodiment of an arrangement of the voltage detection circuit 23. In FIG. 7, elements and parts identical to those of FIG. 2 are marked with the identical reference numerals.

As shown in FIG. 7, the resistor R7 and the reference voltage generation shunt regulator IC2 may be connected between the power supply terminal 51 and the ground terminal 52 in series. A series circuit of the resistors R8 and R9 may be connected to the shunt regulator IC2 in parallel. Then, a voltage developed at the junction between the resistors R8 and R9 may be supplied to the shunt regulator IC2. The shunt regulator IC2 may increase or decrease a current flowing thereto in such a manner that this voltage may become constant. Thus, a predetermined reference voltage Vrf may be obtained at the junction between the resistors R7 and R8. Incidentally, the power supply voltage Vcc may be supplied to the power supply terminal 51 from the standby DC/DC converter 10.

The resistors R5 and R6 may be connected between the detection voltage input terminal 53 and the ground terminal 52 in series. The voltage Vs may be supplied to the detection voltage input terminal 53 as the detection voltage. A junction between the resistors R5 and R6 may be connected through a parallel circuit of the diode D3 and the resistor R10 and the capacitor C1 in series to the ground terminal 52. A junction between this parallel circuit and the capacitor C1 may be connected to the negative input terminal of the comparator IC1.

A junction between the resistors R7 and R8 may be connected through the resistor R4 to the positive input terminal of the comparator IC1. Then, the output terminal of this comparator IC1 may be connected through a series circuit of the diode D2 and the resistor R3 to the positive input terminal of the comparator IC1. The resistors R3 and R4 may give a hysteresis characteristic to the comparator IC1. Also, the diode D2 may function as a reverse-current blocking element.

Assuming that Va is a voltage developed at the junction between the resistors R5 and R6, then when the voltage of the AC power supply 1 is low (e.g. 100V), since the voltage Va supplied to the negative input terminal of the comparator IC1 may be set so as to become lower than the voltage supplied to the positive input terminal of the comparator IC1, the output VDE1 of the comparator IC1 goes to high level. When on the other hand the voltage of the AC power supply 1 is high (e.g. 220V), since the voltage Va supplied to the negative input terminal of the comparator IC1 is set so as to become higher than the voltage supplied to the positive input terminal of the comparator IC1, the output VDE1 from the comparator IC1 goes to low level.

Figure 8:
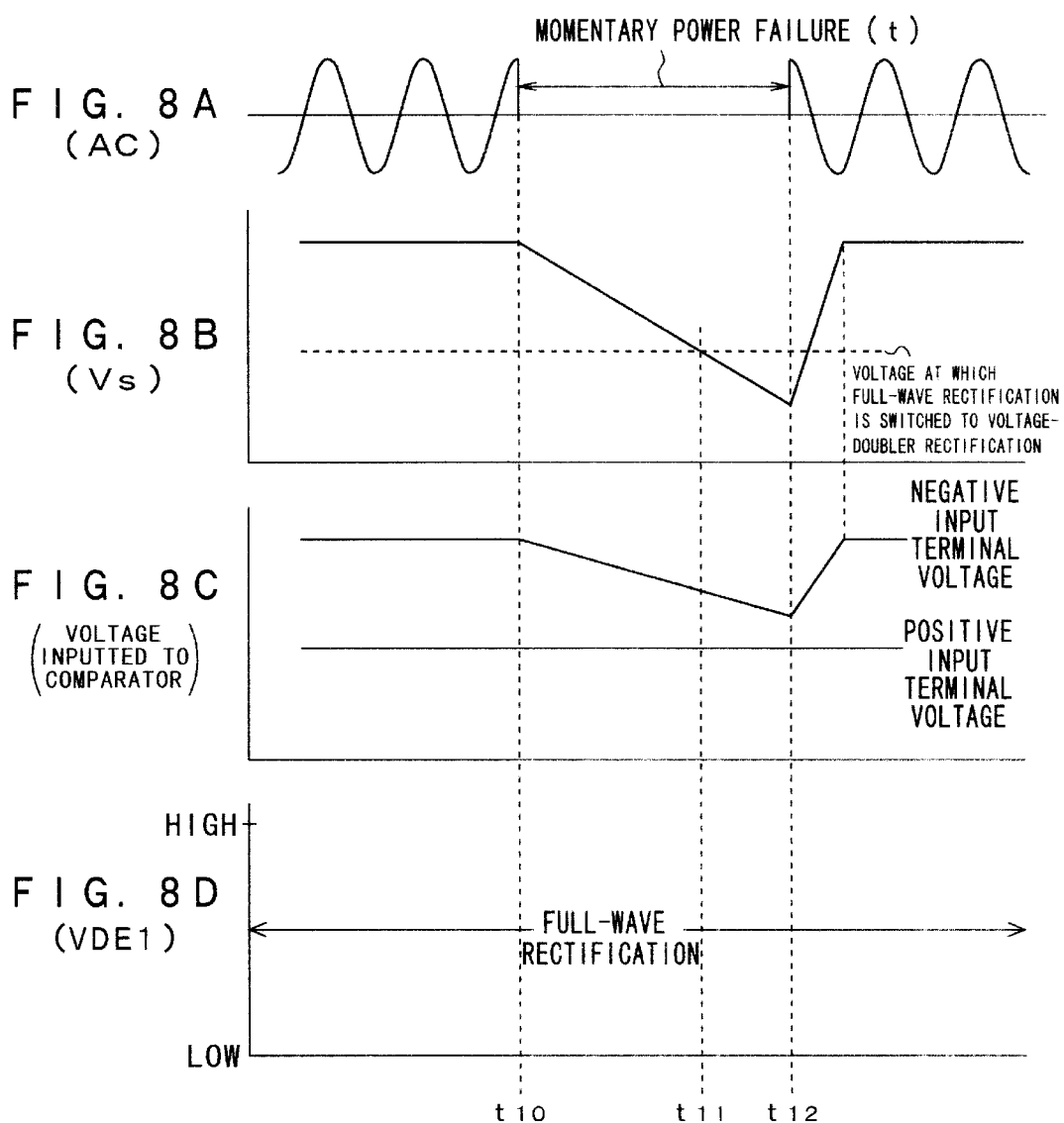
FIGS. 8A to 8D are, respectively, diagrams to which reference will be made in explaining the manner in which the voltage detection circuit is operated when a momentary power failure occurs.

Also, under the state in which the voltage of the AC power supply 1 is high, accordingly, the contact 21a of the relay 21 is turned on so that the full-wave rectification is effected, when a power failure of a short period of time such as a time t occurs in the AC power supply 1 as shown in FIG. 8A, the detection voltage Vs progressively decreases and then increases after the power failure is ended as shown in FIG. 8B.

At that very moment, the voltage supplied to the negative input terminal of the comparator IC1 is changed as shown in FIG. 8C. When a power failure of a short period of time occurs at a time t10, the detection voltage Vs progressively decreases. Thus, at a time t11, even when this voltage becomes a voltage at which the full-wave rectification is switched to the voltage-doubler rectification, the voltage supplied to the negative input terminal of the comparator IC1 drops slowly as compared with the voltage Vs being lowered.

As a consequence, even at a time t12 in which the power failure of the short period of time is ended, the voltage inputted to the negative input terminal of the comparator IC1 is made higher than the voltage supplied to the positive input terminal. Then, the voltage supplied to the negative input terminal of this comparator IC1 may increase in accordance with the increase of the voltage Vs after the time t12. Accordingly, in the voltage detection circuit 23 thus arranged, even when the power failure of short period of time occurs in the AC power supply 1, the output VDE1 outputted from the comparator IC1 can be prevented from going to high level, and hence the full-wave rectification can be continued. Thus, even when the voltage of the AC power supply 1 is high and the power failure occurs, the voltage-doubler rectification can be prevented from being effected, thereby resulting the main DC/DC converter 6 can be protected.

Incidentally, the reason that the diode D3 is provided in parallel to the resistor R10 is that the capacitor C1 should be charged quickly when the detection voltage Vs is supplied.

Also, the voltage detection circuits 24, 27 are arranged similarly to the voltage detection circuit 11 shown in FIG. 2 and the charge and discharge circuit comprising the resistor R10, the capacitor C1 and the diode D3 shown in FIG. 7 may be omitted. The reason for this will be described below. When the voltage of the AC power supply 1 is high (e.g. 220V), the output VDE 1 from the voltage detection circuit 23 is held at low level. Therefore, regardless of the level of the output VDE2 from the voltage detection circuit 24, the output signal from the AND circuit 25 remains low level so that the voltage-doubler rectification can be prevented from being performed. Since the charge and discharge circuit is not provided in the voltage detection circuit 23 as described above, a manufacturing cost can be decreased. Instead of the voltage detection circuit 23, the voltage detection circuit 24 may include the above-mentioned charge and discharge circuit.

Figure 9:
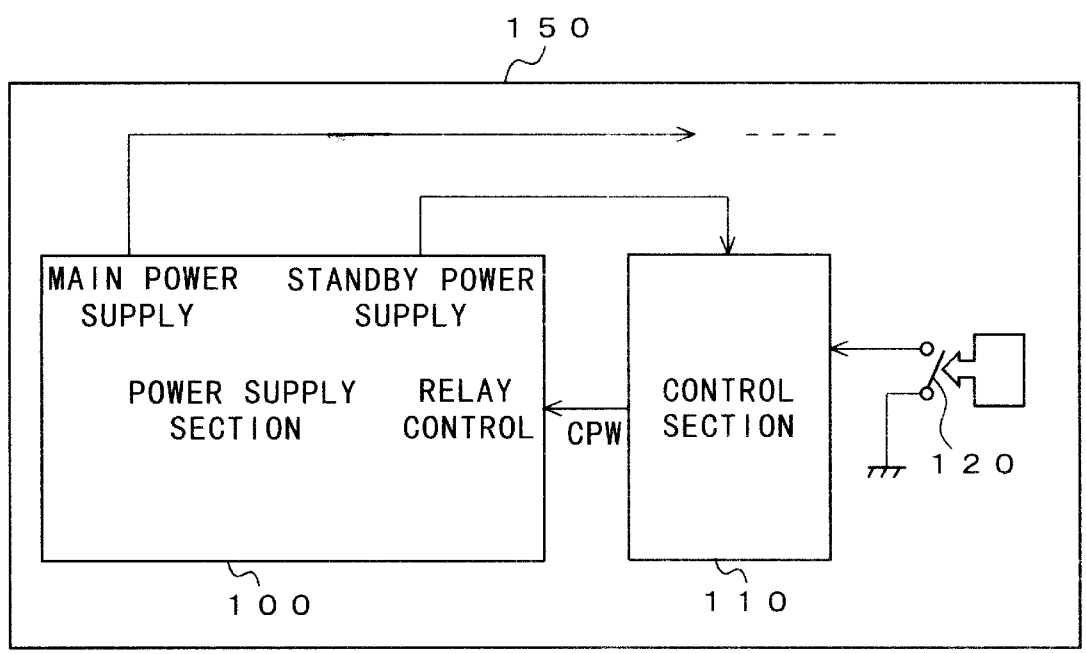
FIG. 9 is a block diagram showing electronic equipment which incorporates therein a power supply apparatus according to the embodiment of the present invention.

FIG. 9 shows an example of electronic equipment 150 including the power supply apparatus 100 shown in FIG. 1 or the power supply apparatus control method shown in FIGS. 5 and 6. When an on-off operation of a power supply switch 120 is detected by a control section 110 and the power supply on-off signal CPW is outputted to the power supply section 100, the main power supply may be switched from the off-state to the on-state or switched from the on-state to the off-state. Instead of the power switch 120, it is possible that a remote control signal may be received by the electronic equipment 150.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A power supply apparatus comprising:
    a main power supply section including a first rectifying circuit supplied with an AC voltage through one of a first switch and a second switch, said first rectifying circuit for rectifying said AC voltage in one of a full-wave rectification fashion and in a voltage-doubler rectification fashion;
    a standby power supply section including a second rectifying circuit for rectifying said AC voltage in a half-wave rectification fashion;
    a first voltage detection section for detecting whether a rectified output from said standby power supply section is higher than or lower than a predetermined threshold voltage;
    a second voltage detection section for detecting whether a rectified output from said main power supply section is higher than or lower than a predetermined threshold voltage; and
    a switch control section for turning on one of said first switch and said second switch based on a detection output from said first voltage detection section and a detection operation from said second voltage detection section.

2. The power supply apparatus as claimed in claim 1, wherein said first and second switches are contacts of first and second relays respectively.

3. The power supply apparatus as claimed a in claim 1, wherein at least one of said first voltage detection section and said second voltage detection section includes a comparator for comparing said predetermined threshold voltage with said rectified outputs and a charge and discharge circuit connected to an input of said comparator and having a discharge time constant larger than a charge time constant.

4. A power supply apparatus comprising:
    a main power supply section including a rectifying circuit supplied with an AC voltage through one of a switch of a first relay and a switch of a second relay, said rectifying circuit for rectifying said AC voltage in one of a full-wave rectification fashion and in a voltage-doubler rectification fashion;
    a standby power supply section for obtaining a standby voltage from said AC voltage;
    a voltage detection section for detecting whether said AC voltage is higher than or lower than a predetermined threshold voltage;
    a first relay drive section for driving said first relay;
    a second relay drive section for driving said second relay;
    a switch control section for controlling operations of said first relay drive section and said second relay drive section based on a detection signal from said voltage detection section such that any one of the switch of said first relay and the switch of said second relay is turned on;
    a switch section for supplying a power source voltage obtained at said standby power supply section to said first relay drive section and said second relay drive section; and
    a power supply on-off control section for controlling on-off of said switch section based on a power supply on-off control signal.

5. The power supply apparatus as claimed in claim 4, wherein said standby power supply section includes a second rectifying circuit for rectifying said AC voltage in a half-wave rectification fashion and said voltage detection section comprises a first voltage detection section for detecting whether a rectified output from said standby power supply section is higher than or lower than the predetermined threshold voltage and a second voltage detection section for detecting whether a rectified output of said main power supply section is higher than or lower than the predetermined threshold voltage.

6. The power supply apparatus according to claim 4, further comprising an abnormal voltage detection section for detecting whether a rectified output from said main power supply section is higher than or lower than the predetermined threshold voltage, wherein said power supply on-off control section controls an on-off state of said switch section based on a detection signal from said abnormal voltage detection section in addition to said power supply on-off control signal.

7. The power supply apparatus as claimed in claim 4, wherein said voltage detection section includes a comparator for comparing said predetermined threshold voltage with said rectified output and a charge and discharge circuit connected at an input of said comparator and having a discharge time larger than a charge time constant.

8. The power supply apparatus claimed in claim 1 or claim 4 further comprising an electronic equipment powered by said rectified output.

9. A power supply apparatus control method for controlling a power supply apparatus having a main power supply section including a first rectifying circuit supplied with an AC voltage through one of a switch of a first relay and a switch of a second relay, said first rectifying circuit for rectifying said AC voltage in one of a full-wave rectification fashion and in a voltage-doubler rectification fashion;

a standby power supply section including a second rectifying circuit for rectifying said AC voltage;

a first relay drive circuit for driving said first relay;

a second relay drive circuit for driving said second relay; and a switch section for supplying a power source voltage obtained from said standby power supply section to said first relay drive section and said second relay drive section, said power supply apparatus control method comprising a detection step for detecting whether said AC voltage is higher than or lower than a predetermined threshold voltage;

a first control step for controlling operations of said first relay drive section and said second relay drive section based on a result of said detection step such that any one of the switch of said first relay and the switch of said second relay is turned on; and a second step for controlling an on-off state of said switch section based on a power supply on-off control signal.

10. The power supply apparatus control method as claimed in claim 9, wherein said detection step includes a first detection step for detecting whether a value corresponding to a rectified output from said standby power supply section is higher than or lower than the predetermined threshold voltage and a second step for detecting whether a rectified output from said main power supply section is higher than or lower than the predetermined threshold voltage.

11. The power supply apparatus control method according to claim 9, further comprising an abnormal voltage detection step for detecting whether a value corresponding to a rectified output from said main power supply section is higher than or lower than a predetermined threshold voltage and wherein said second control step controls the on-off state of said switch section based on a detection signal of said abnormal voltage detection step in addition to said power supply on-off control signal.

12. The power supply apparatus control method claimed in claim 9 further comprising connecting an electronic equipment to the rectified output from said main power supply section and to the rectified output from said standby power supply section.

* * * * *